(12) United States Patent
Worthington et al.

(10) Patent No.: US 7,866,549 B2
(45) Date of Patent: Jan. 11, 2011

(54) IDENTIFICATION DATA DECODER

(75) Inventors: Wayne Worthington, Granbury, TX (US); Brett Stallard, Dallas, TX (US)

(73) Assignee: Picacho Partners LLC, Plano, TX (US)

( * ) Notice: Subject to any disclaimer, the term of this patent is extended or adjusted under 35 U.S.C. 154(b) by 582 days.

(21) Appl. No.: 11/388,614

(22) Filed: Mar. 23, 2006

(65) Prior Publication Data

US 2007/0221723 A1  Sep. 27, 2007

(51) Int. Cl.
*G06K 5/00* (2006.01)
(52) U.S. Cl. .................. 235/380; 235/383; 235/435; 235/462.15
(58) Field of Classification Search .............. 235/380, 235/383, 435, 462.15, 462.25
See application file for complete search history.

(56) References Cited

U.S. PATENT DOCUMENTS

| | | | | |
|---|---|---|---|---|
| 5,140,146 A * | 8/1992 | Metlitsky et al. | ....... | 235/462.26 |
| 5,258,604 A * | 11/1993 | Behrens et al. | ....... | 235/462.15 |
| 5,745,794 A | 4/1998 | Poloniewicz et al. | | |
| 5,789,728 A * | 8/1998 | Barile et al. | ............. | 235/462.1 |
| 5,864,623 A | 1/1999 | Messina et al. | | |
| 5,875,415 A * | 2/1999 | Lieb et al. | ................... | 702/122 |
| 5,920,059 A * | 7/1999 | Barile et al. | ........... | 235/462.07 |
| 6,050,491 A * | 4/2000 | Shepard et al. | ....... | 235/472.02 |
| 6,115,678 A * | 9/2000 | Lieb et al. | ................... | 702/122 |
| 6,463,416 B1 * | 10/2002 | Messina | ....................... | 705/1 |
| 6,705,527 B1 * | 3/2004 | Kelly et al. | ............ | 235/472.01 |
| 7,380,705 B2 * | 6/2008 | Terlizzi et al. | ......... | 235/462.15 |
| 2002/0030104 A1 * | 3/2002 | Matsui et al. | ............... | 235/454 |
| 2005/0080649 A1 * | 4/2005 | Alvarez et al. | ................ | 705/1 |

* cited by examiner

*Primary Examiner*—Daniel A Hess
*Assistant Examiner*—Ali Sharifzada
(74) *Attorney, Agent, or Firm*—Mark Rodgers

(57) ABSTRACT

The invention is a system component which may be installed in systems used to, in an automated fashion, acquire and process identification data from sources such as drivers licenses. The novel component is typically installed between the reader and the processing unit of such systems. Preferably the novel component replaces the cabling between the reader and processing unit. In this configuration, the component adds an electronic module placed serially in the cable. The electronics module accepts raw data from the reader in a variety of formats, and decodes and re-formats the data in a pre-determined format understood by the processing unit. Thus the novel component allows the system to accept multiple data formats without extensive re-programming of the processing unit.

4 Claims, 4 Drawing Sheets

IDENTIFICATION DATA DECODER

RELATED APPLICATIONS

Not Applicable

FEDERALLY SPONSORED RESEARCH

Not Applicable

SEQUENCE LISTING

Not Applicable

BACKGROUND OF THE INVENTION

This invention relates to acquiring identification (ID) data from multiple sources, and in particular a data decoding component which can be added to, or designed into, existing ID processing devices.

Many transactions, from using credit cards to checking in at airports to purchasing age-restricted products, require positive identification, along with pertinent ID data from the person initiating the transaction. To date, acquiring ID data in an automated fashion has been restricted to special purpose applications such as age verification for alcohol purchases in areas having strict control of such purchases, such as "dry" counties or states. For most current applications, ID verification requires presentation and human inspection of a card which establishes ID, or a person hand-entering his private ID verification information.

Despite the limited general application to date, a significant amount of work has been done in the area of automated acquisition of data from the most common ID card, the drivers license, particularly since digitally encoded data is currently or becoming available on many licenses. Although most individuals, at least in the developed countries, have drivers licenses, and most drivers licenses contain the pertinent ID information required for many transactions, automated drivers license inspection faces many obstacles. For one, drivers licenses from differing granting bodies utilize a variety of media for encoding data, including one or more of magnetic stripe, bar-code, and steganographic patterns. In addition to variations in encoding media, there is no commonly adhered format for how the data is encoded. On the other hand the ubiquitous nature of drivers licenses make them an attractive ID verification, particularly compared to suggested alternatives such as separate government-issued ID cards, which have been suggested by the Homeland Security Department of the US government, among other governmental bodies. Such separate universal ID cards face significant political and practical barriers.

Scanners have been produced that can read and output raw data from multiple types of encoding media. Examples of such scanners are Models 250 and 200 available from E-Seek corporation and the Model 4710 available from Handheld Products Inc. These scanners can read optically and/or magnetically encoded data from ID cards such as licenses. Such scanners can be designed into new systems, or often easily retrofitted into existing systems.

The problem of differing drivers license data formats is much less well addressed. To date, the approach to decoding card reader data from differing formats has been to program decoding software into the processors associated with ID reading and processing systems. Such approaches are described in U.S. Pat. No. 5,864,623 and it's associated family members. Such an approach, and others including software products available from the assignee of this invention, may be appropriate for a new ID system design, or where suitable software-configurable systems already exist.

However, there is a very large number of installed systems and existing designs, such as ATM machines, automated gasoline pumps, automated airline check-in machines, POS systems, Credit Card terminals, security terminals and many others, which could benefit greatly from the ability to read ID information. Most of these machines cannot easily be re-programmed to decode multiple data formats, such as required for universal reading of drivers licenses, without extensive new software design. Therefore it is the object of this invention to provide a novel approach to ID data decoding, which will allow for ID data acquisition across a much wider spectrum of applications without the need for separate ID cards or extensive new equipment design.

BRIEF SUMMARY OF THE INVENTION

The invention is a component or a system which reads and processes identification (ID) data by acquiring data from media with a reader and processing the data with a processing unit. The component typically is interposed between the reader and processing unit. The component includes an electronic interface to the reader, an electronic interface to the processing unit, and a decoding element which receives the raw data from the reader and provides decoded data to the processing unit. The decoding element includes: a function for receiving the raw digital ID data; a function for inspecting the ID data and determining the format of the raw data; a function for extracting pertinent ID data from raw data of multiple format types; a function for reformatting pertinent ID data into at least one predetermined format known to the processing unit; and a function for transmitting the reformatted ID data to at least one of the reader and processing unit.

In various versions the novel component is envisioned to be compatible with systems where the raw digital data is read from at least one of a drivers license, a governmental body issued ID card or device, or a private ID card or device.

In a preferred embodiment, the novel component is a stand-alone product which includes: at least one cable configured to mate with a port of the reader which provides the raw digital ID data; at least one cable configured to mate with a port of the processing unit which receives ID data; and an electronics module which connects to each cable, the module thereby disposed electronically between the processing unit and the reader.

In one version, the module is powered by an internal source. In another version, the module is powered through at least one of the cable to the reader or the cable to the processing unit. The module typically contains digital logic, configured to implement the receiving, inspecting, extracting, re-formatting and transmitting functions. In a preferred embodiment, the module can be updated with new formats through industry standard or other techniques.

BRIEF DESCRIPTION OF THE DRAWINGS

The invention will be better understood by referring to the following figures.

DETAILED DESCRIPTION OF THE INVENTION

Figure 1:
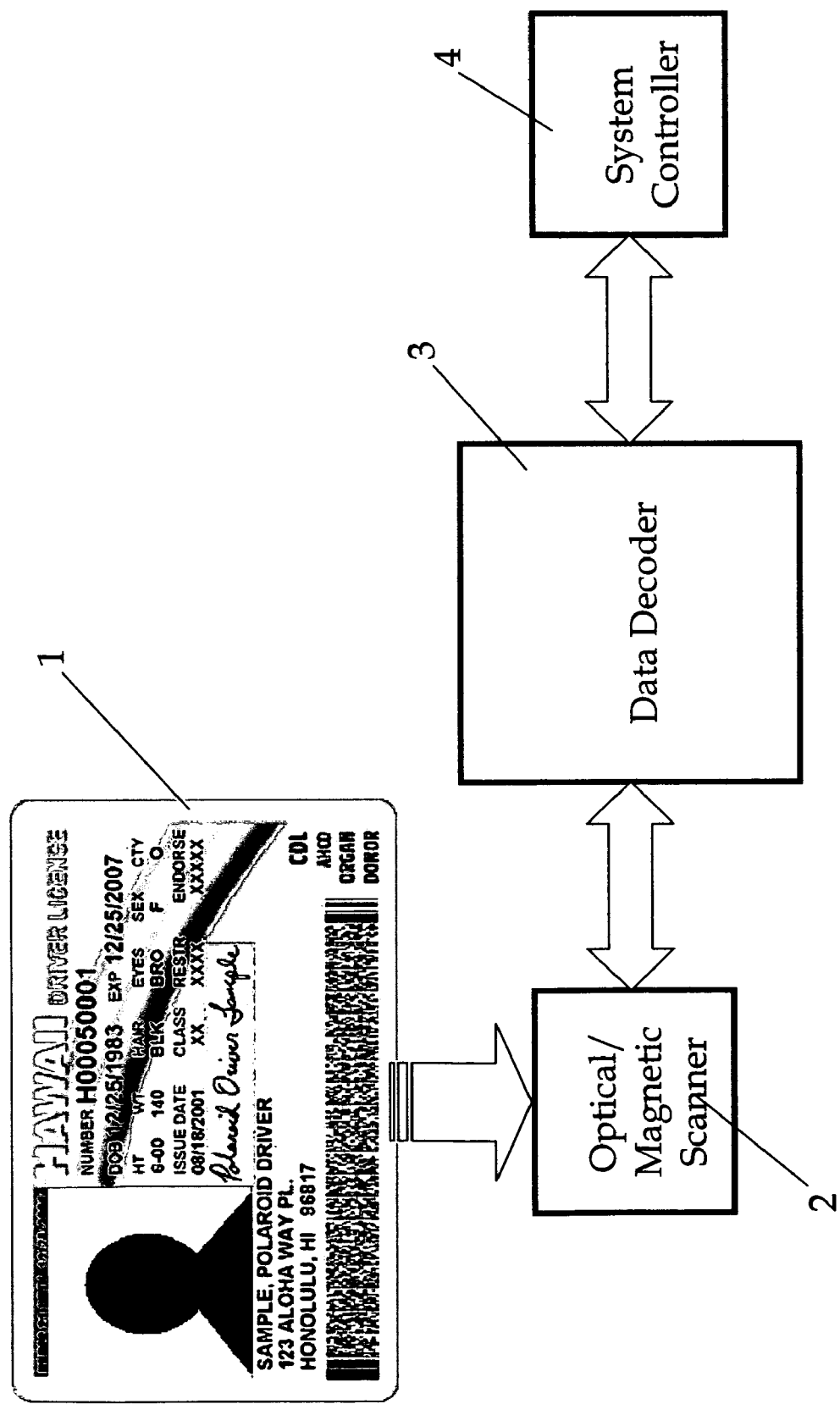
FIG. 1 is a schematic representation of an exemplary system using the novel component

The invention is illustrated generally in FIG. 1. ID card, exemplified by drivers license 1 is scanned by reader 2. Preferably, to take advantage of the invention, the reader or scanner is of a type that can read several different types of encoding media. For example, the license shown, from Hawaii, has a modified high density barcode on the front. A California license has a magnetic strip on the back and a steganographic pattern on the front. Many other configurations of optical, magnetic, or mixed encodings are found on the drivers licenses of the world. Scanners exist, as described above, that can read multiple encoding configurations.

In a conventional system, the scanner 2 output, typically a character data stream, such as RS-232, is connected directly to the system controller or processor 4. Most conventional systems can recognize only one data format. Some conventional systems, based on easily programmable processors, such as personal computers, may include decoding software which will be able to extract information from more than one format.

The format problem is basically, that although standards exist and are known in the art for drivers license encoded data, the existing standards are not tight enough to allow for straightforward data extraction from licenses issued by different bodies. So even if the system scanner can convert the information from the barcode or strip into a character data stream, the system processor does not know the order and arrangement of the character stream.

Following is data read from a license from Arkansas:

%ARLITTLE ROCK^SAMPLE$SUSAN$^P.O. BOX 1272 ROOM 2120 ?;0636021999000680=031219701212?&0072205 D F511121 BR BR ?

Below is data read by the same reader from a license issued by Wisconsin:

@[LF]☐ANSI
6360310101DL00290198DLDAQZ3324416336107[LF]
DAAZZZDOTIES,JANE,A[LF]DAG4802 SHEBOYGAN AVE[LF]DAH[LF]DAIMADISON[LF]DAJWI[LF]
DAK53702 [LF]DARDM [LF]DASA [LF]DAT [LF]
DAU506[LF]DAW157[LF]DAYBRO[LF]DAZBRO[LF]
DBA20041001[LF]DBB19631001[LF]DBCM[LF]DBD
20020329

Both of these data streams contain essentially the same information, ie name, date of birth, address, height. Weight, eye/hair color etc, but the format of the data is quite different. Practically every state and country's driver's license has its own unique data format.

Currently, an automated ID system may only be able to read one type of format, or utilize software, if possible, to recognize more than one type. However, most existing and planned machines cannot accept or execute major software changes. As noted above, automated transaction machines such as ATM's automated fuel pumps, POS systems and automated check-in/ticketing machines could experience much better security and compliance with laws, such as age related ordinances, if a drivers license, for instance could also be read. It is often a relatively simple matter to install a new scanner in such machines. It is almost impossible to get most machines of this type to run decoding software.

Thus the need for the invention, an additional component of the system, which performs a data decode function shown at 3 in FIG. 1.

Figure 2:
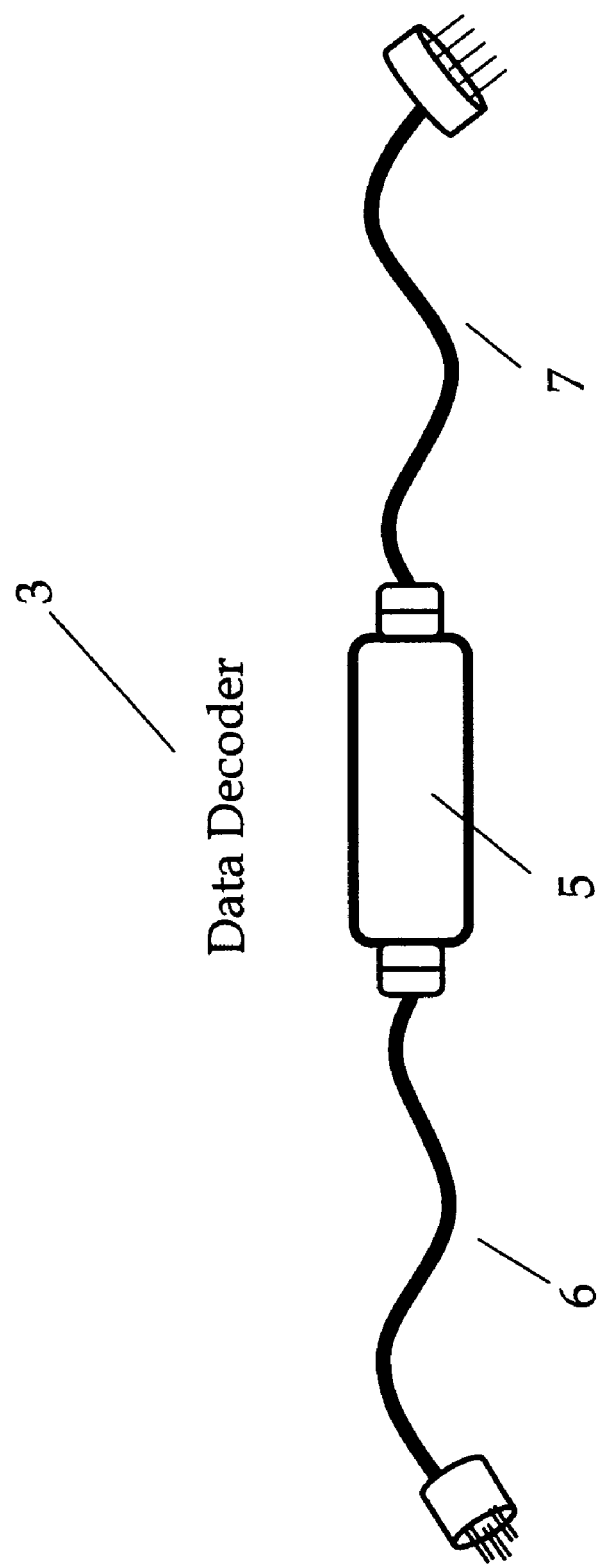
FIG. 2 is an abstract pictorial representation of the preferred embodiment

The preferred embodiment of the invention is represented pictorially in FIG. 2. Typically the scanner is connected to the controller or processor by cable. For example cable end 6 may plug into the reader and cable end 7 may plug into the controller. In the preferred embodiment of the invention, an electronics module 5 is added to the reader/processor cable. This could be done in a variety of ways, such as cables 6 and 7 being separate cables that plug into both their respective units on one end and the module on the other, or the module could be hardwired into a cable that plugs into the reader and processor on opposite ends. Many arrangements will suggest themselves depending on the configuration of reader and scanner connection schemes, and the example shown is not intended to be limiting, but rather exemplary.

Figure 3:
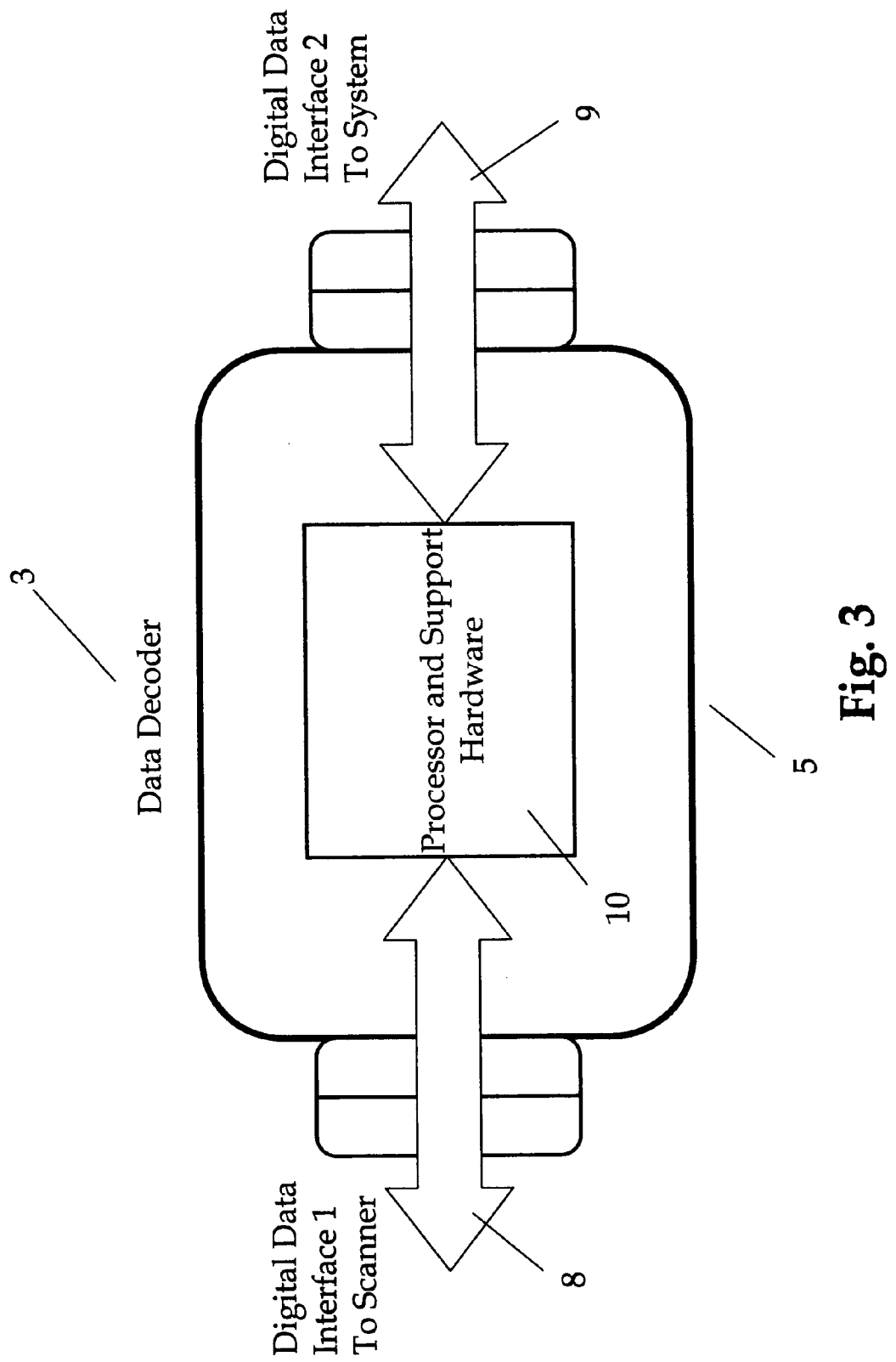
FIG. 3 is a block diagram of the electronics module of the preferred embodiment

The arrangement of module 5 is illustrated schematically in FIG. 3. A digital data stream, from the reader is received at 8. This stream may be of a variety of protocols, such as RS-232, USB, or other standard or proprietary protocols. Thus the module must contain circuitry or programmable logic to receive data at 8. The module typically contains circuitry, logic, or embedded programming to inspect the data stream and determine the format type, such as the state issuing the license for instance. If the data type is known to the module, the module extracts the pertinent ID data for the system in which the module is installed. Then the data is formatted into a configuration usable to the system controller. The module then transmits the data to the controller at 9. Either the raw data or re-formatted data could be echoed back at 8, depending on the nature of the digital interface, and the display characteristics of the reader.

The basic functions of the decoder element of the invention could be implemented by a variety of types of electronics module. Digital logic, programmable arrays, custom chip designs, and microprocessors are possible implementations. The module could be powered over the interface cables, plug into other sources of external power, or be internally powered. Many arrangements of electronic implementation will suggest themselves to one skilled in the art based on the teachings of the invention, and should be considered within the invention's scope. Additionally the module could be configured to accept new formats or changes to existing formats through industry standard or other techniques, such as downloads form the system processing unit, or from an external programming device such as a teach terminal, which may require an additional input to the module.

The advantage of the invention, particularly the embodiment shown, is that it plugs into a place where an existing cable (or cables) already exists, and is thus easy to add to existing system designs. Of course, the inline implementation shown is not the only way to add an external hardware decoder, but this approach has been found to be particularly useful by the inventors.

Figure 4:
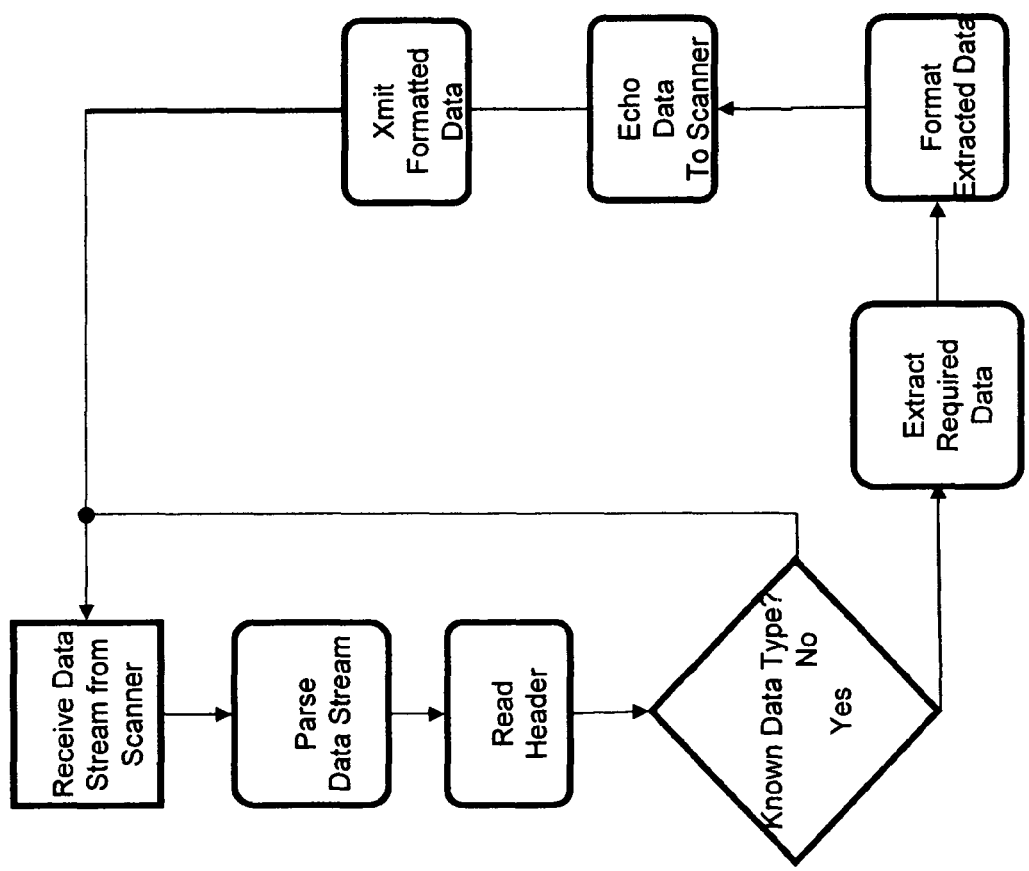
FIG. 4 is a flow chart of the operation of the decoding function of the novel component.

FIG. 4 is a simplified flow chart of a process that can be implemented on a microprocessor, used in an exemplary electronics module according to the invention. Data is received from scanner or reader, inherently assumed is an appropriate digital data receive function exists in the processor or support circuitry. The data is parsed into sections and the header is read. The header is read and compared to stored examples, for example all known drivers license types. If the data type cannot be identified, the module goes back to receive mode. If the data type is known, the required data is extracted. Then the extracted data is formatted to be compliant with the system controller. The formatted data in this example is echoed back to the scanner, and also transmitted to the system controller.

Thus a novel component, particularly useful when added to existing ID processing systems, has been shown. Many variations on electronic implementation, packaging, and specific functionality will be apparent to skilled practitioners depending on the configuration of various ID processing systems existing or in the future. All such variations should be considered within the scope of the following claims. Also, the drivers license has been shown by example, but various scannable ID cards, devices such as pay tokens or other types could benefit from implementations of the invention.

We claim:

1. For a system which reads and processes identification (ID) data by acquiring data from media with a reader, outputting a character data stream and processing the character data stream with a processing unit, a component interposed in the character data stream between the reader and processing unit; comprising;
   an electronic interface to the reader,
   an electronic interface to the processing unit; and,
   a element which receives the character data from the reader and provides character data to the processing unit, wherein:
   the element comprises;
      a function for receiving the character ID data,
      a function for reading the header of the character ID data and determining the type of the data,
      a function for extracting ID data characters, including name, date of birth, hair/eye color, height, weight, and address, known to be present in the determined data type,
      a function for re-arranging the extracted ID data characters into at least one predetermined ordering and arrangement known to the processing unit; and,
      a function for transmitting the re-arranged ID character data to at least one of the reader and processing unit.

2. The character ID data of claim 1 wherein data is read from at least one of;
   a drivers license,
   a governmental body issued ID card or device; or,
   a private ID card or device.

3. The component of claim 1 wherein the component is a stand-alone product comprising;
   at least one cable configured to mate with a port of the reader which provides the ID character data,
   at least one cable configured to mate with a port of the processing unit which receives ID character data; and,
   an electronics module which connects each cable, the module thereby disposed electronically between the processing unit and the reader.

4. The module of claim 3, comprising;
   digital logic, configured to implement the receiving, inspecting, extracting, re-formatting and transmitting functions.

* * * * *